Nov. 28, 1961 F. A. KROHM 3,010,137
WINDSHIELD WIPER ARM AND BLADE ASSEMBLY
Original Filed May 7, 1945 2 Sheets-Sheet 1
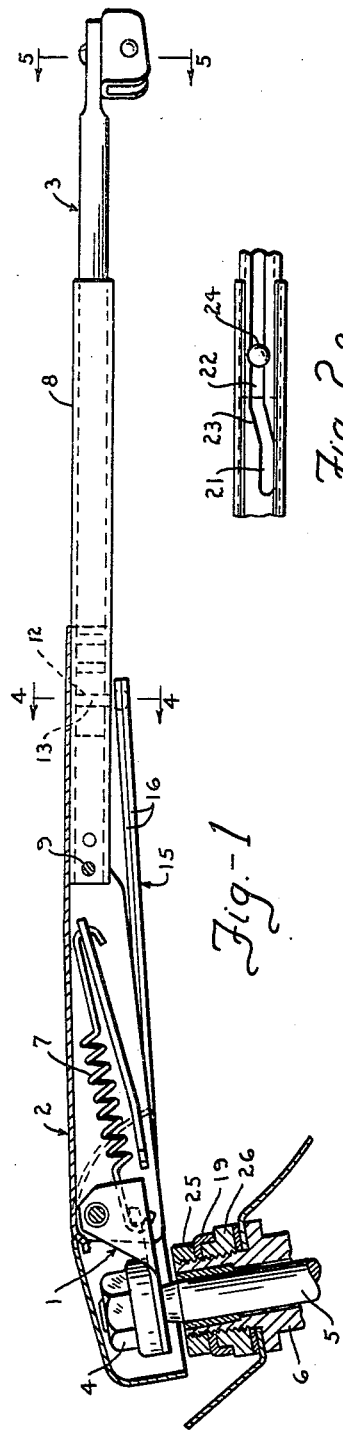
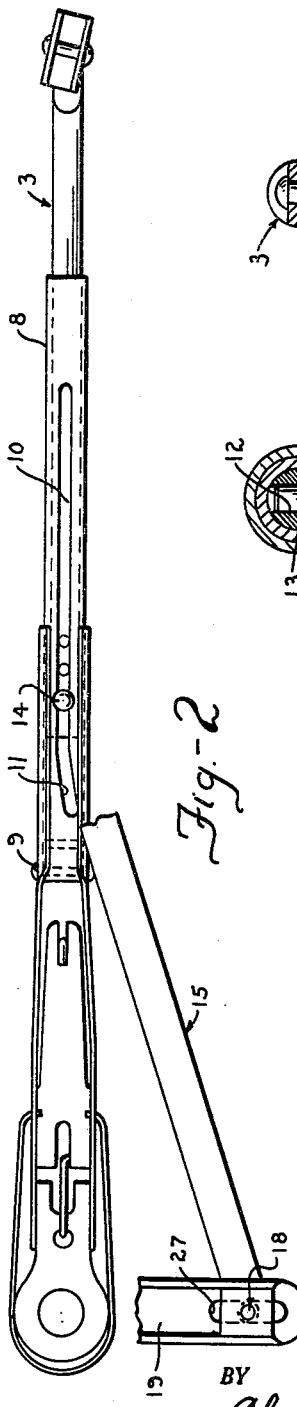
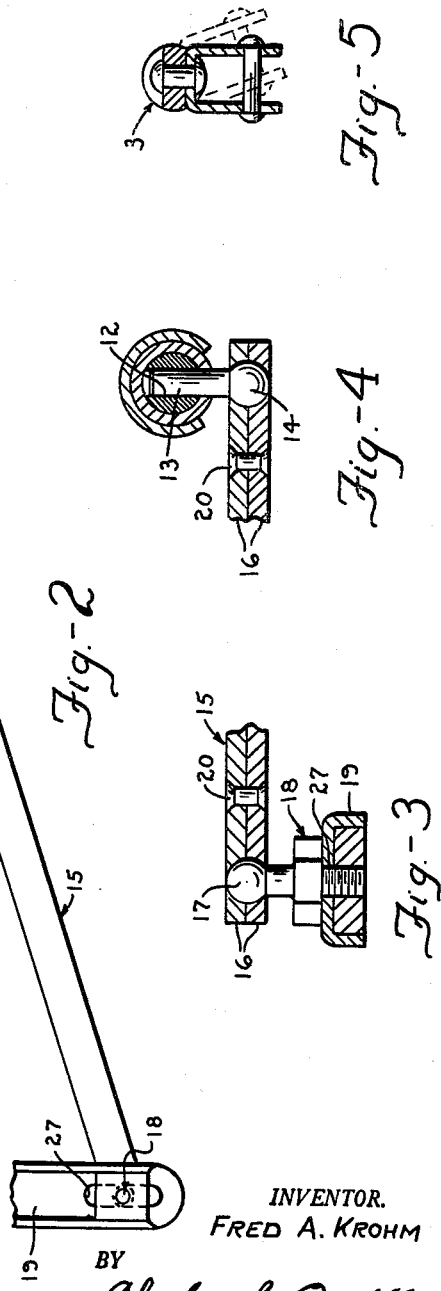
INVENTOR.
FRED A. KROHM
BY
Charles S. Penfold
ATTORNEY Nov. 28, 1961   F. A. KROHM   3,010,137
WINDSHIELD WIPER ARM AND BLADE ASSEMBLY
Original Filed May 7, 1945   2 Sheets-Sheet 2
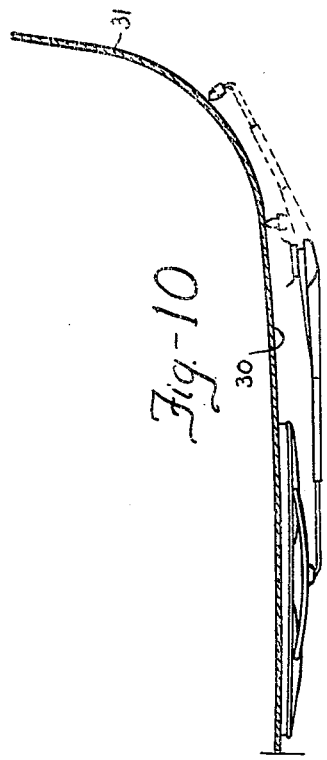
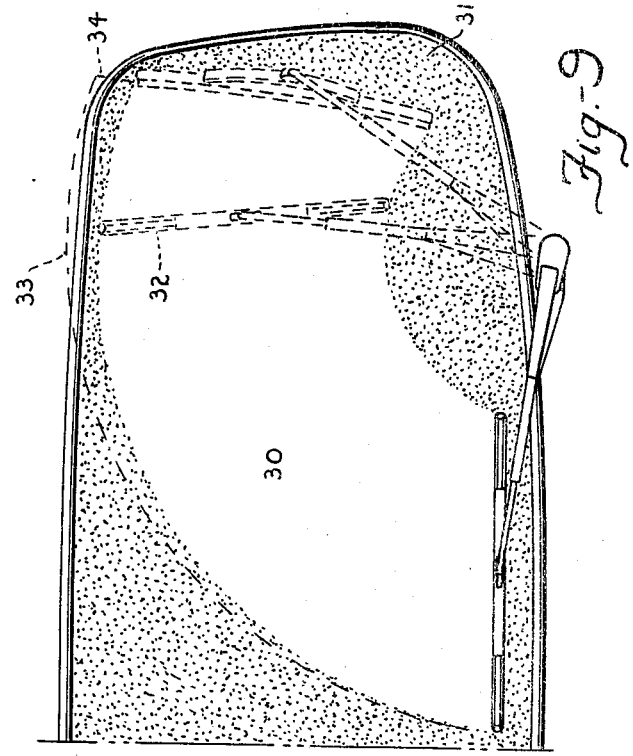
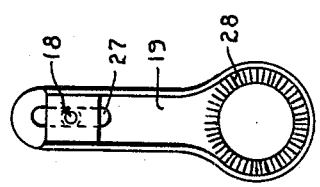
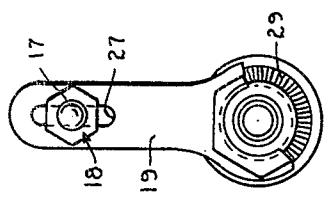
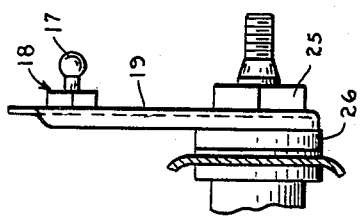
INVENTOR.
FRED A. KROHM
BY
Charles S. Perfold
ATTORNEY

United States Patent Office 3,010,137
Patented Nov. 28, 1961

3,010,137
WINDSHIELD WIPER ARM AND BLADE ASSEMBLY
Fred A. Krohm, Hobart, Ind., assignor to The Anderson Company, a corporation of Indiana
Continuation of application Ser. No. 428,245, May 7, 1945. This application Aug. 21, 1959, Ser. No. 835,370
22 Claims. (Cl. 15—250.21)

This invention relates generally to windshield wiper devices and more particularly is directed to a wiper arm and/or combination of an arm assembly with a wiper blade and a movement-modifying arm to provide an improved system of wiping a curved surface.

The windshields of automotive vehicles are being made longer and with curved rearwardly extending extremities or wings to promote vision and styling. In the trade, windshields of this character are referred to as the wraparound type.

The design of windshield structures now provided on some vehicles has advanced to an extent where conventional wipers are incapable of satisfactorily cleaning certain areas of a windshield, particularly at or adjacent the curved wings. Some areas due to the narrow width and extreme curvature of the glass are not wiped at all by a conventional wiper. In fact a conventional wiper blade operating through a true arc in approaching a wing will leave the windshield so that a portion of the blade will extend into space and/or beyond the edges of the windshield in which event only a small part of the wing is cleaned. This condition results in poor visibility and therefore is detrimental to safe driving.

With the foregoing in mind, one of the principal objects of the invention is to provide wiper apparatus comprising a wiper blade-carrying arm with means for reciprocating and pivoting the blade with respect to the longitudinal axis of the arm so that the blade will be caused to readily conform to a particular portion of the windshield to be wiped.

More specifically, the arrangement is such that the blade during a complete stroke in one direction from a parked position will progressively move toward the drive shaft supporting the wiper arm and as the blade approaches the wing portion of the windshield it will be pivoted so as to reach and wipe a prescribed area which could not be wiped by a blade restricted for movement in a true arc by conventional apparatus. In other words, the invention offers a means whereby the blade will be held erect in conforming relationship to the surface to be cleaned and during its oscillation across the windshield will be caused to pivot only at a predetermined location as the blade also moves toward and away from the drive shaft supporting the wiper arm.

More particularly an object of the invention is to provide a novel apparatus comprising, among other things, a primary arm having an inner section for attachment to a drive shaft, an intermediate section pivotally connected to the inner section, guide means on the intermediate section, cam means on the guide means, an outer extensible arm section slidable and rotatable on the guide means, and a cam follower carried by the inner extremity of the extensible section and cooperable with the cam means; a secondary or movement-modifying arm having one end pivoted to the cam follower on the extensible section of the primary arm and its other end arranged for attachment to a mounting so that when the primary arm is oscillated across a windshield by the drive shaft the extensible section and a blade carried thereby will be caused to rotate about the general longitudinal axis of the arm as well as reciprocate lengthwise with respect to the arm. The arrangement is preferably such that the extensible section will be rotated only when the cam means and cam follower are operatively connected.

An important object of the invention is to provide the guide means of the primary arm with means for holding the extensible section against rotational movement until the cam follower engages the cam means. The arrangement is preferably such that the extensible section and blade can be pivoted or rotated as a unit so that the blade will wipe certain critical areas at or adjacent the wing portion of the windshield that could not be reached except for such motion.

A particular object of the invention is to provide improved means for facilitating adjustment between the guide means and intermediate arm section for varying the location or period that the cam means and follower will be engaged so that the blade will wipe different areas on the same windshield or area on windshields of different forms or curvatures.

Another object of the invention is to provide a secondary arm with adjustable means preferably adapted for support on the bearing in which the drive shaft is mounted so as to facilitate initial installation and parking of the windshield wiper apparatus and for regulating the oscillating stroke of the primary arm to promote adjustment thereof to meet different operating requirements.

Additional objects of the invention are to provide wiper apparatus which is durable and positive in operation.

Other objects and advantages of the invention will become apparent after the description hereinafter set forth is considered in connection with the drawings annexed hereto.

In the drawings:

FIGURE 1 is a side view of the primary arm structure with portions in section and shows the mode of connecting the arm to a drive shaft;

FIGURE 2 is a bottom view showing the operative relationship of the primary arm and secondary or movement-modifying arm;

FIGURE 2A is a partial view showing a different form of cam means that may be employed;

FIGURE 3 is a partial enlarged sectional view illustrating the manner of operatively connecting the movement-modifying arm with a fitting attached to the drive shaft mounting;

FIGURE 4 is an enlarged sectional view taken substantially on line 4—4 of FIGURE 1 and shows the connection between the modifying arm and the cam follower;

FIGURE 5 is a sectional view of a connector carried by the extensible arm section and shows that this section and connector as a unit are rotatable about the longitudinal axis of the primary arm;

FIGURES 6 and 7 are views showing the manner of adjustably connecting the fitting to the drive shaft mounting;

FIGURE 8 is a bottom view of the fitting;

FIGURE 9 is a front view of a windshield showing different positions of the wiper apparatus and wiper blade associated therewith; and FIGURE 10 is a partial longitudinal sectional view taken through a windshield showing different positions of the arm structure and wiper blade.

This application is a continuation of my application Serial No. 428,245, filed May 7, 1954, the latter having been abandoned in favor of the subject application.

Referring more particularly to the drawings, the primary arm above referred to includes, among other things, an inner section 1, an intermediate elongate section 2 pivotally connected to the inner section, and an outer extensible section 3 mounted for slidable and rotatable movement with respect to the intermediate section.

The inner arm section of the primary arm is preferably provided with means including a nut 4 for detachably securing the arm in any one of a number of predetermined fixed positions on a drive shaft 5, the latter of which is rotatably supported in a mounting 6 which extends through the cowl of a vehicle body.

The intermediate section 2 of the primary arm is preferably of channel shape. An assembly including a helical spring 7 is housed within the channel and one end of the spring is connected to the inner section and its other end to a member which in turn is attached to the intermediate section for urging the intermediate and extensible arm sections as a unit toward a windshield. The intermediate section is further provided with tubular guide means 8 which actually constitutes a continuation of the intermediate or channel section. This guide means may be secured in the intermediate section in any manner desired, but is preferably detachably secured in place by a removable rivet or fastener 9 which extends through holes provided therefor in the intermediate section and guide means. The guide means is preferably round in cross section and rotatably supports the extensible section 3 which is also round in cross section. The guide means is provided with means preferably in the form of a longitudinal slot having a spiral or helical continuation 11 constituting a cam means. It will be noted that the inner extremity of the guide means as depicted in FIGURES 1 and 2 is provided with a plurality of holes in order that a rivet, such as 9, can be located in either of the holes so that the guide may be adjusted to different positions and thereby afford a control for regulating the location or period it is desired to effect rotation of the extensible arm section 3.

The inner extremity of the extensible arm section is provided with a hole 12 and a pin 13 constituting a cam follower which has its inner end anchored in the hole. The shank of the pin is adapted for movement in the slot and is provided with a spherical head 14 which is connected for universal movement with respect to the outer end of a movement-modifying arm generally designated 15. It should be noted that the extensible arm section, as illustrated in FIGURES 1 and 2, is provided with additional holes like 9 for selectively receiving the pin in order to vary the sliding and rotational action of the extensible section. The movement-modifying arm is preferably comprised of a pair of corresponding elongate flat members 16. The outer ends of the members are preferably provided with corresponding recesses which cooperate with one another to provide a socket which receives the head 14 of the pin 13. The inner ends of the members are similarly formed to receive a spherical head 17 of a shaft of a bolt assembly 18 attached to an elongate fitting 19. Rivets 20 are preferably employed to secure the members 16 of the movement-modifying arm together in superimposed relationship so that the spherical heads of the pin and shaft are locked for universal movement with respect to the modifying arm.

As clearly shown in FIGURE 2 of the drawing, the pin 13 or cam follower when sliding in the longitudinal slot 10 serves to prevent rotation of the extensible arm section 3, but when the pin moves into the continuation 11 it will cause rotation of the extensible arm section.

As exemplified in FIGURE 2A of the drawing, a guide means may be formed so as to provide a pair of parallel longitudinal slots 21 and 22 joined by a helical slot 23 constituting a cam means. A cam follower 24 is disposed for movement in the slots. With this arrangement the follower will cause the extensible arm section to rotate between the periods of its straight longitudinal movement in either of the slots 21 and 22. It is thus evident that the rotational movement of the extensible section can be varied.

As depicted in FIGURES 1 through 4, the fitting 19 is provided with an inner enlarged end which is preferably detachably connected to the drive shaft mounting 6 by and between a pair of nuts 25 and 26 threaded on the mounting. The outer end of the fitting is provided with a slot 27 through which the shaft of the bolt assembly extends so that the modifying arm can be adjustably secured to the fitting for the purpose of varying the travel of the extensible section 3 of the primary arm which carries the wiper blade. The inner enlarged end of the fitting is provided with an aperture through which the threaded portion of the drive shaft mounting extends and is further provided with serrations 28 which cooperate with corresponding serrations 29 preferably provided on the upper end or surface of the nut 26 to firmly secure the fitting in place after adjustment. With this arrangement, the travel of the extensible arm can be varied to suit different installation requirements. The adjustments between the modifying arm and fitting and between the fitting and the shaft mounting all contribute toward control of the extensible arm section. The fact that the complete apparatus is supported on the drive shaft and mounting therefor also facilitates installation.

In view of the foregoing, and referring to FIGURES 9 and 10 of the drawing, the wiper apparatus is shown in a parked position and in different operative positions on a windshield having a frontal portion 30 and a wing portion 31. When the blade is moved upwardly and toward the right the blade will take the path shown by the unshaded area. More specifically in this regard, the extensible section and blade can move only longitudinally as it traverses the frontal portion 30 of the windshield. When the blade reaches or approaches the dotted-line position 32 at the beginning of the bent wing portion of the windshield, the movement-modifying arm 15 will pull the follower further inwardly and into the slot 11 and thereby effect pivotal or rotational movement of the extensible arm section as shown in FIGURE 5 and maintain the blade in a substantially erect surface-conforming position as exemplified in FIGURES 9 and 10 as it travels over the wing of the windshield. The blade will traverse the same path on its return movement. In addition to wiping a windshield at the places described, the blade is prevented from banging against the windshield frame.

The importance of the invention is perhaps best exemplified in FIGURE 10 where the arm if mounted for movement through a true arc in the conventional way, would cause the blade to travel the path indicated by the dotted lines 33 and cause at least a portion of the blade to swing off the windshield into space as indicated by the dotted-line position 34.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper structure comprising an arm assembly having an outer section slidably and rotatably mounted for movement with respect to the remainder of the arm assembly, means for sliding the outer section relative to the remainder of the arm assembly, and means for effecting rotational movement of the outer section about the longitudinal axis of the arm assembly.

2. A windshield wiper arm assembly comprising an inner section, an intermediate section pivotally connected to the inner section and an outer arm section slidably and rotatably mounted for movement with respect to the intermediate section, means for sliding the outer section relative to the intermediate section of the arm assembly, and cam means for effecting rotational movement of the outer section about the axis of the arm assembly.

3. A windshield wiper arm assembly comprising an inner section, an intermediate section pivotally connected to the inner section, and an outer arm section slidably and rotatably mounted for movement with respect to the axis of the intermediate section when the arm assembly is in operation, and a connector provided on said outer section for supporting a blade.

4. A windshield wiper structure comprising an arm assembly provided with guide means, an outer section of the arm assembly mounted on the guide means for longitudinal and rotary movement relative to the axis of the guide means and provided with means for supporting a wiper blade, and means provided on the outer section cooperating with means on the guide means whereby to impart a rotary movement to the outer section about the axis of the guide means when the latter is moved longitudinally of the guide means.

5. A windshield wiper arm assembly comprising an inner section, an intermediate section pivotally connected to the inner section and provided with guide means having a slot consisting of a longitudinally extending portion and a continuation thereof, an outer arm section slidably and rotatably mounted in the guide means, and means carried by the outer section disposed for movement in the slot, said last-mentioned means being adapted for connection with an actuator therefor to reciprocate the outer section while the means is in the longitudinal portion of the slot and for rotating the outer section when the means is moved in the continuation of the slot.

6. A windshield wiper structure comprising an arm assembly provided with guide means having a slot divided into a longitudinally extending portion and an angularly disposed portion, an outer section of the arm assembly mounted for longitudinal and rotatable movement in the guide means, means projecting from the outer section for movement in the slot, and an actuator connected to the said projection means, the arrangement being such that when the projection means is in the longitudinal portion of the slot the outer section can be reciprocated and when the projection means is in the angular portion of the slot this section can be rotated.

7. A wiper for wiping a curved windshield provided with a frontal portion and a wing portion, a drive shaft adapted to be located adjacent the junction between said portions of the windshield, a wiper arm connected to the shaft and provided with a guide, a member movable in the guide and supporting a wiper blade, a plurality of means on the guide and means on the member cooperable with said plurality of means, and an actuator connected to the means on the member, the arrangement being such that when the actuator is operated the means on the member will engage one of the means on the guide to cause reciprocation of the member and blade when the blade moves on the frontal portion of the windshield and will engage another of the means on the guide to cause rotation of the member and blade when the blade moves on the wing portion of the windshield.

8. A windshield wiper structure comprising an arm assembly provided with guide means having a slot with a longitudinally extending portion and a helically disposed portion, an outer arm section of the arm assembly mounted for longitudinal and rotatable movement in the guide means, means projecting from the outer section for movement in the slot, the arrangement being such that the outer section can be moved longitudinally when the projection means is in the longitudinal portion of the slot and can be rotated when the projection means is in the helically disposed slot.

9. A windshield wiper arm assembly comprising an arm section having guide means provided with a pair of longitudinally extending slots and an intervening slot joining the longitudinal slots, an outer arm section mounted in the guide means for longitudinal and rotational movement, and means extending from the outer section disposed for movement in the slots, said extending means being adapted for connection with an actuator therefor for imparting longitudinal movement to the outer section when the extending means is in either of the longitudinal slots and for rotating the outer section when the means is in the intervening slot.

10. A windshield wiper arm assembly comprising an inner section, an intermediate section pivotally connected to the inner section and provided with a support, guide means on the support, an outer section slidably and rotatably mounted on the support, and movable means disposed for engagement with the guide means on the support, said movable means being adapted for connection with an actuator therefor to reciprocate the outer section when the movable means is in engagement with one portion of the guide means on the support and for rotating the outer section when the movable means is moved into engagement with the other portion of the guide means on the support.

11. A wiper for wiping a curved windshield provided with two related portions to be wiped, a drive shaft adapted to be located adjacent the junction between said portions of the windshield, a wiper arm connected to the shaft and provided with a guide member, a member movable in the guide member and supporting a wiper blade, a plurality of means on one of the members and means on the other member cooperable with said plurality of means, and an actuator connected to the means on the other member, the arrangement being such that when the actuator is operated the means on the member will engage one of the means on the guide to cause reciprocation of the member and blade when the blade moves on one portion of the windshield and will engage another of the means on the guide to cause rotation of the member and blade when the blade moves on the other portion of the windshield.

12. A windshield wiper arm assembly comprising an inner section for detachably securing a wiper arm on a drive shaft, an intermediate section pivotally connected to the inner section and an extensible section slidably and rotatably mounted on said intermediate section, means including a movement-modifying arm for sliding said extensible section, and means for effecting rotational movement of said extensible section, whereby a wiper blade mounted on the extensible section moves longitudinally as well as longitudinally and rotationally of the wiper arm as said wiper blade moves toward or away from the drive shaft during its oscillations across the windshield such that said wiper blade is held at all times in a predetermined position relative to the surface of the windshield to be cleaned.

13. A windshield wiper arm assembly comprising an inner section, an intermediate section pivotally connected to the inner section, an elongate guide connectible with the intermediate section in one of a plurality of positions, an outer arm section slidably and rotatably mounted for movement with respect to the guide, said guide being provided with a cam, a projection connectible with the outer section in one of a plurality of positions for engaging the cam, and means connected to the projection for sliding the outer section relative to the arm assembly so that the projection will engage the cam for effecting rotational movement of the outer section about the axis of the arm assembly.

14. A wiper for wiping a curved windshield provided with a frontal portion and a wing portion, a bearing adapted to be located adjacent the junction between said portions of the windshield and provided with a fitting, a drive shaft journalled in the bearing, a wiper arm connected to the shaft and provided with a guide, a member movable in the guide and supporting a wiper blade, a plurality of means on the guide and means on the member cooperable with said plurality of means, and an actuator connected to the fitting and to the means on the member, the arrangement being such that when the shaft is operated the actuator will cause the means on the member to engage one of the means on the guide to cause reciprocation of the member and blade when the blade moves on the frontal portion of the windshield and will engage another of the means on the guide to cause rotation and reciprocation of the member and blade when the blade moves on the wing portion of the windshield.

15. A windshield cleaner wiper arm mounted for use with curved windshields comprising a mounting section adapted for connection to an oscillatory drive, an intermediate section hinged to said mounting section for movement toward and away from an associated windshield, a wiper-carrying section, means mounting said wiper-carrying section for rocking movement on said intermediate section about generally the longitudinal axis of said arm to maintain a predetermined upright attitude of a wiper carried thereby relative to an associated windshield surface, and actuator means shiftable lengthwise of said arm as the latter is oscillated to so rock said wiper-carrying section.

16. A windshield cleaner wiper arm adapted for use with a curved windshield comprising a mounting section adapted for connection with an oscillatory drive, an intermediate section hinged to said mounting section for movement toward and away from the windshield, a wiper-carrying section, means mounting said wiper-carrying section for rocking movement on said intermediate section about generally the longitudinal axis of said arms to maintain a predetermined upright attitude of a wiper when carried thereby relative to the windshield surface, and actuator means shiftable lengthwise of said arm when the latter is oscillated to so rock said wiper-carrying section.

17. A windshield wiper arm adapted for use with a curved windshield, said arm comprising an inner section adapted for attachment to an actuating member, an intermediate spring-urged section pivotally connected to the inner section, an outer section rotatably mounted on the intermediate section and provided with a connector for supporting a blade capable of conforming to the surface of the windshield, and means for rotating the outer section generally about the longitudinal axis of the arm to maintain the blade in a predetermined upright attitude with respect to said surface.

18. A windshield wiper arm adapted for use with a curved windshield, said arm comprising an inner part for attachment to an actuating member and elongate structure having an inner end connected to the inner part and an outer end for supporting a resiliently flexible blade capable of conforming to the surface of the windshield, said elongate structure including a pair of members operatively connected for relative longitudinal and rotational movement, and means for effecting such relative movement so that such a blade when carried by the outer end of the elongate structure for wiping the windshield will be maintained at a predetermined upright attitude with respect to said surface.

19. A windshield wiper arm adapted for use with a curved windshield, said arm comprising an inner part for attachment to an actuating member and an elongate spring-urged structure hinged to the inner part for movement toward and away from the windshield, said elongate structure comprising a pair of members connected for relative rocking movement and means for supporting a blade capable of conforming to the surface of the windshield to be cleaned, and means for effecting a rocking movement of one member generally about the longitudinal axis of the arm when the latter is oscillated relative to the windshield to cause such a blade when carried by the arm to maintain a predetermined upright attitude with respect to said surface.

20. A windshield wiper arm and a wiper blade, said arm comprising an inner section adapted for attachment to an operating member and an elongate structure having an inner end pivotally connected to the inner section, resilient means operatively connecting the inner section and elongate structure for urging the latter toward a curved surface of a windshield, said blade comprising a resilient wiper element and a support therefor, said support being resiliently flexible substantially in only a single plane so the element will readily conform to the curved surface to be wiped, a pressure device comprising a plurality of relatively movable elements operatively connected to the blade for applying pressure thereto at longitudinally spaced locations, means connecting the pressure device and said elongate structure in a manner whereby the pressure device and blade as a unit can be moved longitudinally of the elongate structure, and means interposed between said last-named means and said inner section for causing the blade to rock about an axis substantially parallel to its longitudinal axis when the unit is so moved in order to maintain the blade substantially normal to said surface when the arm is oscillated.

21. A windshield cleaner for wrap-around windshields, comprising an oscillatory drive shaft, a wiper arm fixed thereto, a flexible surface conforming wiper having an elongate blade and a pressure-distributing superstructure, means mounting the superstructure on the arm for swinging the wiper about an axis substantially parallel to the longitudinal axis of the blade, a second means anchored at one end and operatively connected to the mounting means, said second means extending lengthwise of the arm and movable relative thereto to actuate the mounting means and thereby swing the wiper about said first-named axis as said arm is oscillated.

22. A windshield cleaner for wrap-around windshields, comprising an oscillatory drive shaft, a wiper arm fixed thereto, a flexible surface conforming wiper having an elongate blade and a pressure-distributing superstructure, means mounting the superstructure on the arm for swinging the wiper about an axis substantially parallel to the longitudinal axis of the blade, a second means anchored at one end and operatively connected to the mounting means, said second means extending lengthwise of the arm and movable relative thereto to actuate the mounting means and thereby swing the wiper about said first-named axis as said arm is oscillated.

References Cited in the file of this patent

UNITED STATES PATENTS

| | | |
|---|---|---|
| 2,079,399 | Drew | May 4, 1937 |
| 2,324,894 | Whitted | July 20, 1943 |
| 2,356,424 | Paton | Aug. 22, 1944 |
| 2,412,319 | Carey | Dec. 10, 1946 |
| 2,533,963 | Sacchini | Dec. 12, 1950 |
| 2,691,186 | Oishei et al. | Oct. 12, 1954 |
| 2,775,780 | Pisano | Jan. 1, 1957 |

FOREIGN PATENTS

| | | |
|---|---|---|
| 1,047,648 | France | July 22, 1957 |